US010427772B2

(12) United States Patent
Fournier et al.

(10) Patent No.: US 10,427,772 B2
(45) Date of Patent: Oct. 1, 2019

(54) HYDROGEN-REGENERATING SOLAR-POWERED AIRCRAFT

(71) Applicant: SOLAR SHIP INC., Toronto (CA)

(72) Inventors: Sebastien Fournier, Toronto (CA); Jay Godsall, Toronto (CA)

(73) Assignee: SOLAR SHIP INC., Toronto, Ontario ( * ) Notice: Subject to any disclaimer, the term of this patent is extended or adjusted under 35 U.S.C. 154(b) by 186 days.

(21) Appl. No.: 15/343,708

(22) Filed: Nov. 4, 2016

(65) Prior Publication Data

US 2017/0073058 A1    Mar. 16, 2017

Related U.S. Application Data

(63) Continuation-in-part of application No. 14/428,906, filed as application No. PCT/CA2013/000791 on Sep. 19, 2013, now Pat. No. 9,527,569.

(Continued)

(51) Int. Cl.
*B64B 1/24*    (2006.01)
*B64D 27/24*    (2006.01)
(Continued)

(52) U.S. Cl.
CPC ............... *B64B 1/24* (2013.01); *B64B 1/06* (2013.01); *B64B 1/62* (2013.01); *B64D 27/24* (2013.01); *B64D 39/00* (2013.01); *C25B 1/003* (2013.01); *C25B 1/04* (2013.01); *C25B 9/00* (2013.01); *B64B 2201/00* (2013.01); *B64D 2211/00* (2013.01); *Y02E 60/368* (2013.01);
(Continued)

(58) Field of Classification Search
CPC ............. B64B 1/24; B64B 1/58; B64C 25/54
See application file for complete search history.

(56) References Cited

U.S. PATENT DOCUMENTS 1,071,180 A    8/1913  Remington
3,945,589 A  *  3/1976  Crompton ................. B64B 1/02
                                                        244/30

(Continued)

FOREIGN PATENT DOCUMENTS

CN    1703580    11/2005
GB    2356184 B    8/2003
(Continued)

OTHER PUBLICATIONS

Khoury, G.A., "Airship Technology (2nd Edition)," Cambridge Aerospace Series vol. 10 Cambridge University Press, 2012, Retrieved on Dec. 7, 2015 from <https://books.google.com/book?id=SiaejBco6NUC>, p. 16.

(Continued)

*Primary Examiner* — Philip J Bonzell
*Assistant Examiner* — Michael B. Kreiner
(74) *Attorney, Agent, or Firm* — Faegre Baker Daniels LLP

(57)    ABSTRACT

An aircraft comprising a hydrogen-containing envelope, a water-collection system for collecting water from the envelope, an electrolyser to convert the water collected using the water-collection system into hydrogen, and a hydrogen-replenishment system for replenishing the envelope with hydrogen generated using the electrolyser. In one embodiment, generated hydrogen is also supplied to a hydrogen-fueled propulsion system for propulsion of the aircraft.

12 Claims, 3 Drawing Sheets

Related U.S. Application Data

(60) Provisional application No. 61/703,207, filed on Sep. 19, 2012.

(51) Int. Cl.
 B64D 39/00 (2006.01)
 C25B 1/04 (2006.01)
 C25B 1/00 (2006.01)
 C25B 9/00 (2006.01)
 B64B 1/06 (2006.01)
 B64B 1/62 (2006.01)

(52) U.S. Cl.
 CPC .............. *Y02E 70/10* (2013.01); *Y02T 50/55* (2018.05); *Y02T 50/64* (2013.01); *Y02T 90/44* (2013.01)

(56) References Cited

U.S. PATENT DOCUMENTS

| | | |
|---|---|---|
| 4,285,481 A | 8/1981 | Biscomb |
| 5,890,676 A | 4/1999 | Coleman et al. |
| 6,315,242 B1 | 11/2001 | Eichstedt |
| 6,425,552 B1 | 7/2002 | Lee et al. |
| 6,841,893 B2 | 1/2005 | Maiwald |
| 7,137,592 B2 | 11/2006 | Barocela |
| 7,249,733 B2 | 7/2007 | Palmer |
| 7,306,187 B2 | 12/2007 | Lavan |
| 8,247,912 B2 | 8/2012 | Da Costa Duarte Pardal et al. |
| 8,372,506 B2 | 2/2013 | Vainshtein |
| 2003/0207164 A1 | 11/2003 | McElroy et al. |
| 2004/0104304 A1 | 6/2004 | Parmley |
| 2006/0091256 A1 | 5/2006 | Palmer |
| 2006/0261213 A1 | 11/2006 | Lavan |
| 2007/0034741 A1 | 2/2007 | Fuller |
| 2009/0065637 A1 | 3/2009 | Duncan et al. |
| 2009/0206194 A1 | 8/2009 | Sinsabaugh |
| 2009/0294576 A1 | 12/2009 | LaForge |
| 2010/0270424 A1 | 10/2010 | DeLaurier |
| 2011/0192938 A1 | 8/2011 | DiMarzio et al. |
| 2012/0138733 A1 | 6/2012 | Hiebl et al. |
| 2013/0062457 A1 | 3/2013 | Deakin |

FOREIGN PATENT DOCUMENTS

| | | |
|---|---|---|
| JP | 2002-255096 | 9/2002 |
| WO | WO2007/139412 | 12/2007 |
| WO | WO2011/117619 | 9/2011 |

OTHER PUBLICATIONS

Turner, Troy, "Collecting Water in the Sky," Retrieved from <http://www.yankodesign.com/2011/08/31/collecting-water-in-the-sky/>, Aug. 31, 2011, 12 pages.

Office Action dated Oct. 21, 2016 on corresponding Chinese patent application No. 201380058156.9, 8 pages.

Search Report dated Oct. 13, 2016 on corresponding Chinese patent application No. 201380058156.9, 3 pages.

European Search Report dated Feb. 12, 2016 in corresponding EP Application No. 13838617.2, 7 pages.

International Preliminary Report on Patentability dated Dec. 27, 2013 in corresponding International Application No. PCT/CA2013/000791, 7 pages.

\* cited by examiner

HYDROGEN-REGENERATING SOLAR-POWERED AIRCRAFT

RELATED APPLICATIONS

The present application is a continuation-in-part of U.S. patent application Ser. No. 14/428,906, filed Sep. 19, 2013, the disclosure of which is hereby expressly incorporated by reference.

TECHNICAL FIELD

The present technology relates generally to aerospace and aircraft and, in particular, to hybrid aircraft and airships.

BACKGROUND

An aircraft, such as an airship, uses a lifting gas such as helium or hydrogen to provide lift. A hybrid aircraft gains lift from both the lifting gas and an aerofoil-shaped wing that also provides aerodynamic lift. Solar hybrid aircraft use the large surface area on the envelope for collection of solar radiation for generating electric power to power electrically driven propellers.

With worldwide shortages of helium, however, there is renewed interest in the use of hydrogen as the buoyant gas.

Replenishment of the buoyant gas, due to leaks, conventionally requires access to a supply of the buoyant gas. This can be problematic when the aircraft is in remote locations or far from industrial centers having replenishment stations.

An improved hybrid aircraft design that addresses these issues would thus be highly desirable.

SUMMARY

In general, the present invention provides an aircraft, such as an airship, having a hydrogen-regenerating capability to regenerate and thus replenish hydrogen gas for the aircraft. Hydrogen regeneration is performed, in general, by collecting water or drawing water from an onboard water tank and then converting this water into hydrogen using electrolysis. The hydrogen generated from this on-board electrolysis of water is used to replenish the gas-containing envelope to compensate for any hydrogen leakage from the envelope.

An aspect of the present invention is an aircraft comprising a hydrogen-containing envelope, an electrolyser to convert water into hydrogen, a water-collection system for collecting water from a body of water and supplying the water to the electrolyser and a hydrogen-replenishment system for replenishing the hydrogen-containing envelope with hydrogen generated using the electrolyser.

Another aspect of the present invention is an aircraft comprising a hydrogen-containing envelope, an electrolyser to convert water into hydrogen, a hydrogen-replenishment system for replenishing the hydrogen-containing envelope with hydrogen generated using the electrolyser, and a purification system for purifying the hydrogen contained within the envelope.

Other aspects of the present invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
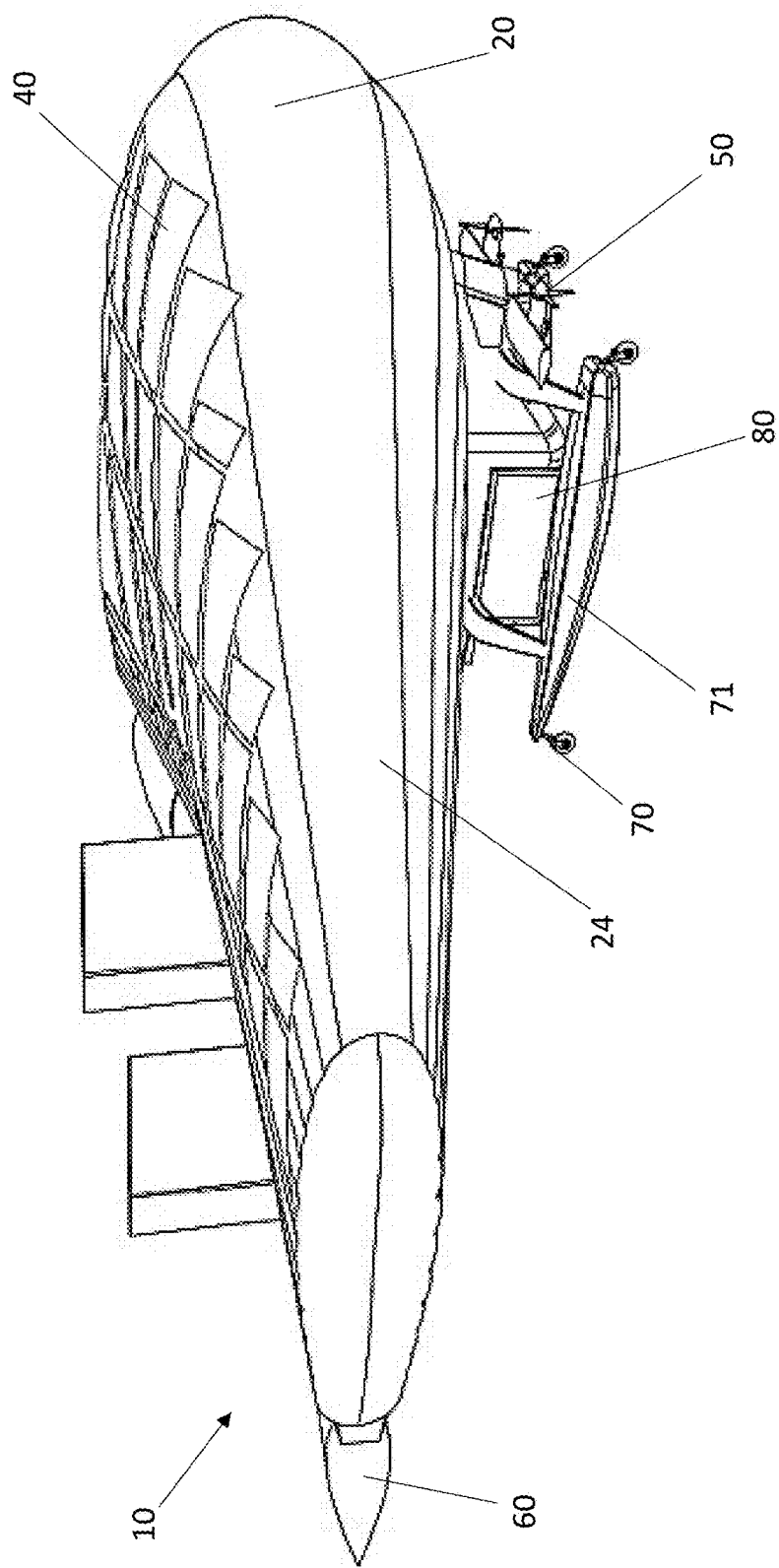
FIG. 1 is an isometric view of an aircraft in accordance with an embodiment of the present invention.
Figure 2:
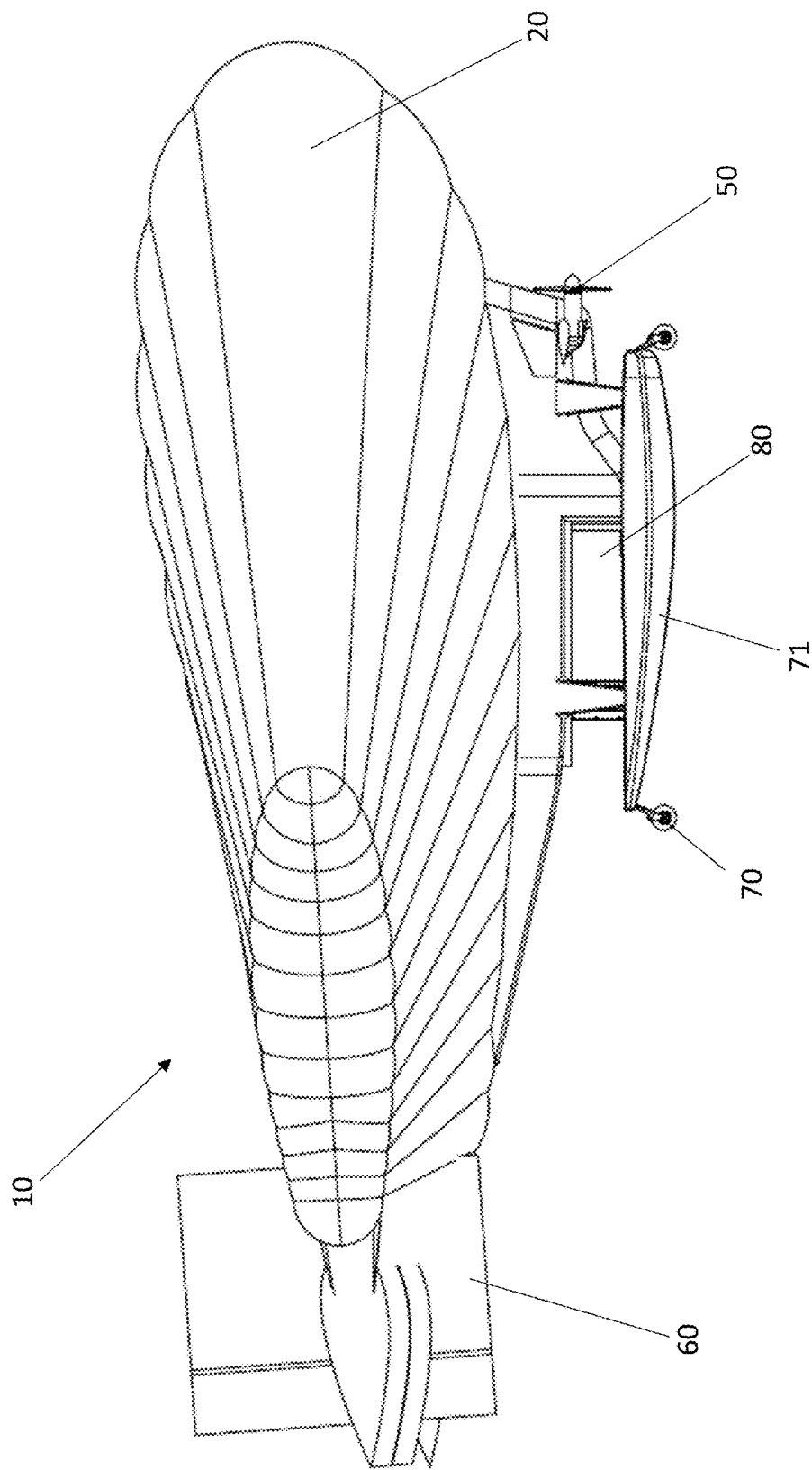
FIG. 2 is a side view in accordance with another embodiment of the present invention.

In the embodiment depicted in FIG. 1 and FIG. 2, an aircraft 10 comprises a hydrogen-containing envelope 20, an electrolyser 30 to convert water into hydrogen, and a hydrogen-replenishment system for replenishing the hydrogen-containing envelope with hydrogen generated using the electrolyser. In the particular embodiment depicted, the aircraft 10 is a hybrid aircraft. In the illustrated embodiment, the envelope of the hybrid aircraft 10 contains hydrogen gas ($H_2$) as a buoyant gas for providing lift, or at least a portion of the lift in conjunction with aerodynamically-generated wing lift, to the hybrid aircraft 10.

As shown in the illustrated embodiment, the envelope 20 of the hybrid aircraft 10 comprises a non-rigid wing-shaped inflatable structure. This wing-shaped inflatable structure comprises an aerofoil geometry to provide aerodynamic lift in addition to the buoyancy provided by the hydrogen gas inside the envelope. Inside the envelope are one or more hydrogen gas cells 24.

Solar radiation collecting elements, e.g. photovoltaic solar panels 40, collect solar radiation to generate electric power from solar radiation. The solar panels 40 may be mounted on a solar panel attachment web to the outer surface of the envelope or directly impregnated into the envelope 20. The solar energy is used to power electric motors 50. These motors 50 drive propellers for providing the forward thrust. The solar-generated electric power may also be used to power control surfaces 60 such as a rudder, flaps, and/or ailerons. Solar-generated power may also be used to retract and deploy a retractable landing gear 70 although a fixed landing gear may be provided. In the preferred embodiment the landing gear comprises floats 71 with retractable wheels to allow for amphibious operation. The electric power from the solar panels 40 may also be used to power onboard electronics (e.g. communication gear, navigation equipment, anti-collision lights, onboard lighting, heating, cooling, ventilation, etc.). Excess electric power may be stored in batteries or ultra-capacitors onboard the aircraft 10. The electric power from the solar panels 40 (or from the batteries or ultra-capacitors) is also used for electrolysis of water to generate hydrogen.

A water-collection system collects water from any number of sources including rain, dew, condensation or even from melting snow. In a preferred embodiment, the aircraft 10 contains means for collecting water from a body of water, such as a lake or river. The aircraft 10 is preferably an amphibious aircraft, equipped with an undercarriage capable of landing or taking off from water or land, and when situated on top of a body of water it is capable of collecting water from that body of water. The undercarriage preferably comprises both wheels and floats 71 as depicted in the figures. However, in another embodiment, the undercarriage may only have the floats 71 in which case the aircraft is not amphibious but a seaplane or float-plane. The means of collecting water from the body of water could be provided in various ways, for example a scooping mechanism like those used in water bombers, or a pump, or an inlet valve on the floats 71 located below the waterline. A reservoir is provided to store water for hydrogen generation. In one embodiment, each float 71 includes a water reservoir or tank. Optionally, a water pump is provided to displace a controlled amount of water from the reservoir in each float to the electrolyser 30. In one embodiment, the floats 71 include dump doors or outlets to discharge any excess or unwanted water or for the purposes of balancing the amount of water in each float. Each reservoir may include a water sensor to measure an amount of water contained in each reservoir. The control of inlets and outlets may be done manually, i.e. in response to user commands, or automatically, i.e. by a control system receiving signals from each water sensor.

In another embodiment, the aircraft 10 may have a water inlet or intake port for receiving a supply of water into the water reservoir. This enables water to be added manually to the water reservoir in cases when there is insufficient water being collected by the water-collection system. In other words, the pilot or ground crew can simply add water to the water reservoir.

The hydrogen-replenishment system comprises, in addition to the electrolyser 30, a hydrogen manifold for supplying hydrogen to one or a plurality of hydrogen cells 24 within the envelope. Deionizer columns or other deionization system such as ion exchange systems may be provided as will be apparent to those skilled in the art.

Hydrogen is thus generated from water collected by the aircraft 10. This on-board production of hydrogen enables automatic top-ups of hydrogen when required. When working in remote areas, relying on top-up infrastructures such as hydrogen tanks or refueling stations is not realistic because the infrastructure is not always available and/or functioning. Therefore, having an on-board system generating the hydrogen needed as the lifting gas for regular top-ups or replenishment renders the aircraft 10 fully self-reliant and self-sufficient.

Optionally, the aircraft 10 may include a hydrogen pressure sensor for gauging, sensing or detecting the pressure of hydrogen in the inner envelope. This pressure sensor may provide a pressure signal to a microprocessor, microcontroller, computer, computing device, ASIC chip, or other control circuitry for the purposes of indicating, via a gauge, display, meter or readout, the hydrogen pressure in the inner envelope or, alternatively, a differential pressure between a desired operating pressure and the actual pressure of the hydrogen inside the envelope. This gauge or readout may be used to determine when to replenish the hydrogen. An alarm or alert may also be provided to the aircraft operator to signify that hydrogen pressure is low and that replenishment is required. Optionally, a control system may be used to automatically control valves in the hydrogen manifold to automatically replenish the hydrogen in the inner envelope when the control system receives a signal indicating that the pressure has fallen below a prescribed level.

In one specific embodiment, the envelope 20 is a double hull having an inner and an outer envelope. Such an arrangement provides a fail-safe hydrogen containment system. With this double envelope design, the inner envelope contains the hydrogen (lifting gas) and the outer envelope contains the inert gas (nitrogen, helium, etc.). The ratio of the volumes of the inner and outer envelopes is selected such that any leak or failure of the inner envelope would not give rise to a hydrogen-to-air mixture greater than 4:100 on a volumetric basis. Moreover, the envelope 20 is preferably made of a fabric that has a hydrogen leak rate not exceeding 2 $L/m^2/day$.

The envelope 20 is not entirely impervious to air, and, if untreated, over time the concentration of air within the envelope 20 will increase. This contamination may be the result of diffusion through the envelope 20 fabric, or leakage through pinholes, tears, loose seams, etc. The presence of oxygen within the hydrogen-containing envelope 20 can present a safety risk that must be carefully managed. Hydrogen gas is highly flammable, however at high hydrogen concentrations, and thus low oxygen concentrations, combustion cannot take place. The upper flammability of hydrogen in air is 75%, and it is therefore desirable to ensure the concentration of hydrogen in the envelope 20 remains above this level. In order to maintain the hydrogen purity at the desired level, the aircraft 10 further comprises a hydrogen purification system.

Figure 3:
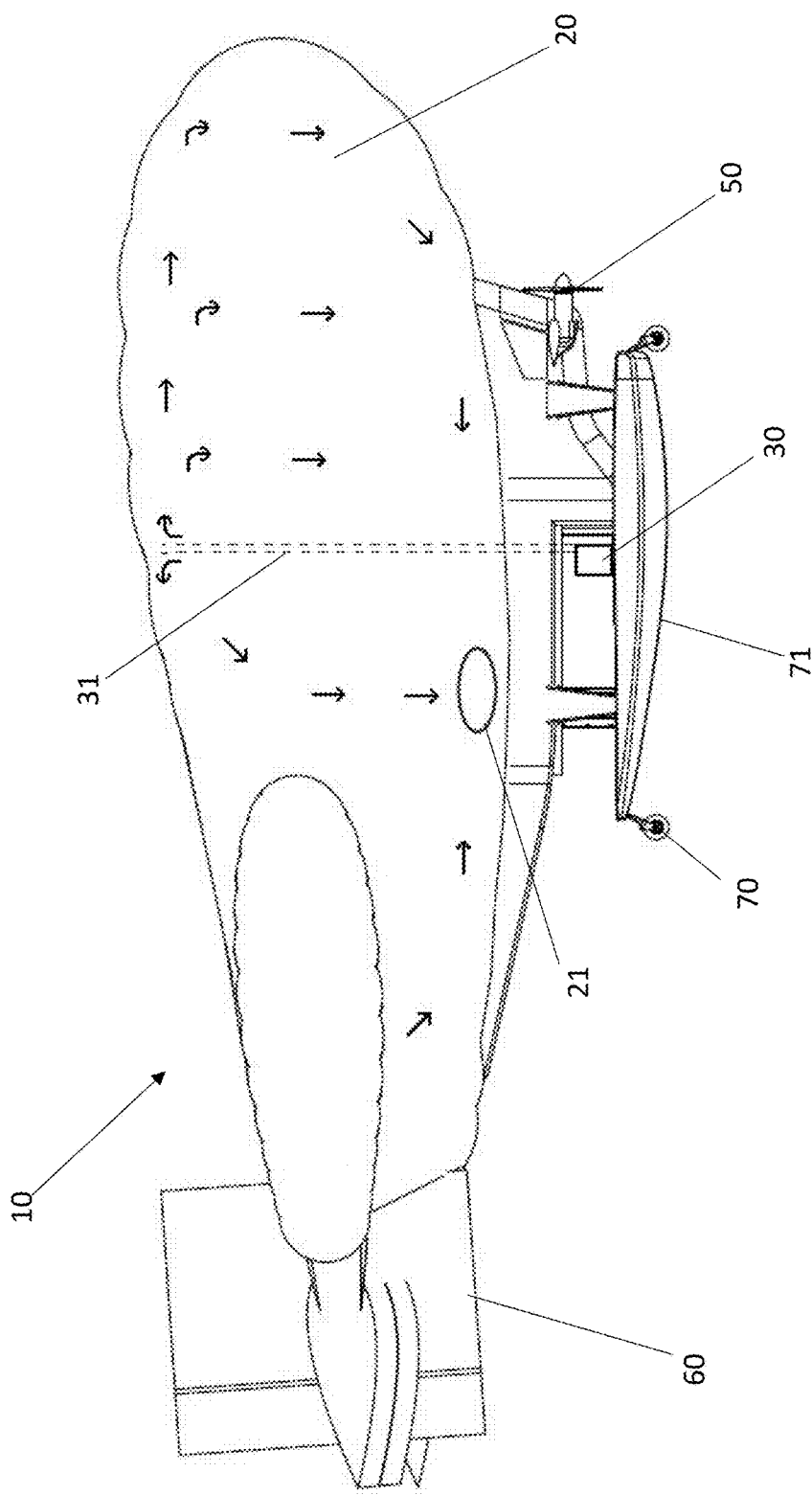
FIG. 3 is a side view of an aircraft comprising a hydrogen purification system in accordance with an embodiment of the present invention.

FIG. 3 illustrates the hydrogen purification system disposed within the aircraft 10. One or more sensors are located within the envelope to detect the concentration of hydrogen. If the detected concentration of hydrogen is below a predetermined threshold value, a valve 21 in the envelope 20 is opened to vent the mixture of air and hydrogen. This level is preferably greater than the upper flammability limit of hydrogen, 75%, but is preferably below 90% to avoid the difficulties of maintaining extremely high purity. As the gas mixture egresses through the valve 21, the amount of air within the envelope 20 decreases. Pure hydrogen generated by the electrolyzer 30 is provided to the envelope 20, replacing the gas vented from the envelope 20 and increasing the hydrogen concentration. The vent 21 may be closed and hydrogen replenishment may cease once a desired upper threshold concentration of hydrogen is reached. This entire process may be performed manually, but is preferably automated. The rate of gas egress is preferably equal to the rate at which hydrogen is replenished, in order to maintain constant pressure inside the envelope 20.

Due to the differing physical properties of hydrogen and air, the gas in the envelope 20 may tend towards stratification, particularly in the absence of any internal fans or blowers. In this case, the concentration of hydrogen would be highest at the top of the envelope 20, while the more dense oxygen and nitrogen gas from the air would concentrate at the bottom of the envelope 20. It is therefore preferable that the valve 21 should be placed towards the bottom of the envelope 20 in order to preferentially vent air. For the same reasons, it is also preferable to introduce pure hydrogen towards the top of the envelope 20, by running a tube or duct 31 from the electrolyzer through the envelope 20. The tube or duct 31 preferably terminates in such a manner as to minimize mixing of the higher hydrogen concentration gas near the top of the envelope 20 with the lower hydrogen concentration gas near the bottom of the envelope 20. This may be accomplished, for example, by introducing the hydrogen at low velocity, or by angling the outlet of the tube or duct 31 in a certain manner, as will be apparent to those skilled in the art. The arrows in FIG. 3 depict the desired flow of gas within the envelope 20.

In another embodiment, the aircraft 10 may not only generate hydrogen to replenish the gas-containing envelope 20 to compensate for leakage from the envelope 20 but the aircraft 10 may also generate hydrogen for fueling a hydrogen-based propulsion system which may be a hydrogen fuel cell or a hydrogen-combustion engine. In one specific embodiment, hydrogen may be fed to a hydrogen fuel cell to generate electric power for driving one or more electric motors 50 that rotate respective propeller(s). In another specific embodiment, hydrogen may be burned in a combustion engine.

In the fuel cell embodiment, the hydrogen may be used to generate electric power that is used to power onboard electronics (e.g. communication gear, navigation equipment, anti-collision lights, onboard lighting, heating, cooling, ventilation, etc.). Therefore, the aircraft 10 may be an all-hydrogen aircraft in which water is converted to hydrogen and the hydrogen is used as a buoyant gas within the lifting envelope 20, as a fuel for propulsion, and a power source (via a fuel cell) for powering on-board electrical equipment (heating, ventilation, air conditioning, etc.) and on-board electronics (avionics, communications gear, navigation equipment, etc.)

Excess generated hydrogen may be stored in a hydrogen storage tank having a fuel line to the hydrogen-fueled propulsion system. The hydrogen storage tank, which may store the hydrogen as a gas or cryogenically as a liquid, may be disposed within the fuselage of the aircraft 10.

Although the figures illustrate a hybrid aircraft, it will be appreciated that the present invention may be applied or adapted to other types of aircraft. An aircraft, for the purposes of this specification, is thus meant to include an airship, air-based or airborne station, air vehicle, flying boat or other flying machine or apparatus that uses hydrogen as a lifting gas.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. An aircraft comprising:
   a hydrogen-containing envelope;
   an electrolyser to convert water into hydrogen;
   a hydrogen-replenishment system for replenishing the envelope with hydrogen generated using the electrolyser; and
   a purification system for purifying the hydrogen contained within the envelope, wherein the purification system comprises a sensor for detecting the concentration of hydrogen within the envelope and one or more valves which are configured to vent gas from the envelope when a concentration of hydrogen below a threshold value is detected.

2. The aircraft of claim 1, wherein the threshold value for hydrogen concentration is any value between 75%-90%.

3. The aircraft of claim 1, wherein hydrogen is replenished at the same rate that gas is vented from the envelope.

4. The aircraft of claim 1, wherein the one or more valves are located at or near the bottom of the envelope.

5. The aircraft of claim 1, wherein the replenishing hydrogen is introduced at or near the top of the envelope.

6. The aircraft of claim 5, wherein the replenishing hydrogen is introduced in a manner which minimizes mixing of pure hydrogen with other gases.

7. The aircraft of claim 1, wherein the envelope comprises a non-rigid wing-shaped inflatable structure.

8. The aircraft of claim 1, wherein the non-rigid wing-shaped inflatable structure comprises an aerofoil geometry to provide aerodynamic lift in addition to the buoyancy provided by the hydrogen gas inside the envelope.

9. The aircraft of claim 1, further comprising solar radiation collecting elements to collect solar radiation and to generate electric power from the solar radiation for supplying electric power to the electrolyser.

10. The aircraft of claim 1, wherein the hydrogen-replenishment system comprises a hydrogen manifold for supplying hydrogen to one or a plurality of hydrogen cells within the envelope.

11. The aircraft of claim 1, wherein the envelope comprises an inner envelope containing the hydrogen surrounded by an outer envelope containing an inert gas.

12. The aircraft of claim 1, further comprising a hydrogen-fuelled propulsion system for propulsion of the aircraft.

\* \* \* \* \*